United States Patent [19]
Chauvin et al.

[11] Patent Number: 5,755,487
[45] Date of Patent: May 26, 1998

[54] OPENING ROOF STRUCTURE FOR A MOTOR VEHICLE

[75] Inventors: René Chauvin, Bressuire; Jean-Marie Jeuffray, Terves, both of France

[73] Assignee: Farnier & Penin SNC, France

[21] Appl. No.: 662,277

[22] Filed: Jun. 12, 1996

Related U.S. Application Data

[63] Continuation of Ser. No. 397,048, filed as PCT/FR94/00922, Jul. 22, 1994, abandoned.

[30] Foreign Application Priority Data

Jul. 22, 1993 [FR] France ................... 93 09028

[51] Int. Cl.⁶ .................................................. B60J 7/047
[52] U.S. Cl. ........................... 296/216; 296/218; 49/465
[58] Field of Search ............................... 296/216, 218, 296/220, 224, 146.16; 49/465

[56] References Cited

U.S. PATENT DOCUMENTS

| | | | |
|---|---|---|---|
| 2,041,281 | 5/1936 | Bishop | 296/224 |
| 3,965,566 | 6/1976 | Green | 29/451 |
| 4,205,875 | 6/1980 | Smith | 296/218 |
| 4,974,902 | 12/1990 | Huyer | 296/224 X |
| 5,054,846 | 10/1991 | Simin et al. | 296/218 |
| 5,154,482 | 10/1992 | Hayashi et al. | 296/224 X |
| 5,193,874 | 3/1993 | German | 296/37.1 |

FOREIGN PATENT DOCUMENTS

| | | | |
|---|---|---|---|
| 175123 | 8/1986 | Japan | 296/220 |
| 55222 | 3/1987 | Japan | 296/216 |
| 178425 | 8/1987 | Japan | 296/216 |
| 2056380 | 3/1981 | United Kingdom . | |
| 2164006 | 3/1986 | United Kingdom | 296/216 |
| 2204283 | 11/1988 | United Kingdom | 296/224 |

*Primary Examiner*—Dennis H. Pedder
*Attorney, Agent, or Firm*—Sixbey, Friedman, Leedom & Ferguson, P.C.; Gerald J. Ferguson, Jr.; Tim L. Brackett, Jr.

[57] ABSTRACT

An opening roof structure for a motor vehicle, the structure comprising a frame (2) secured around the edge of an opening formed in the roof (1) of the vehicle, a window (4) which in a first position forms a panel for at least substantially closing the opening, a hinge (6) for the window (4) which is integral with the front edge (2a) of the frame (2) to removably receive corresponding hinge elements (5) secured to the window (4) about its hinge (5, 6) to the frame (2), the control device extending between the rear edge (2b) of the frame (2) and the window (4) from which they can be separated, at least in part, in which both the frame (2) and the window (4) have coupling devices in waiting which are placed in mutual co-operation when, after the window (4) has been uncoupled from the hinge (5, 6) and at least partly separated from the pivot control device, the window (4) is placed in a second position in which it overlies the rear edge (2b) of the frame (2).

10 Claims, 3 Drawing Sheets

PRIOR ART
FIG_1
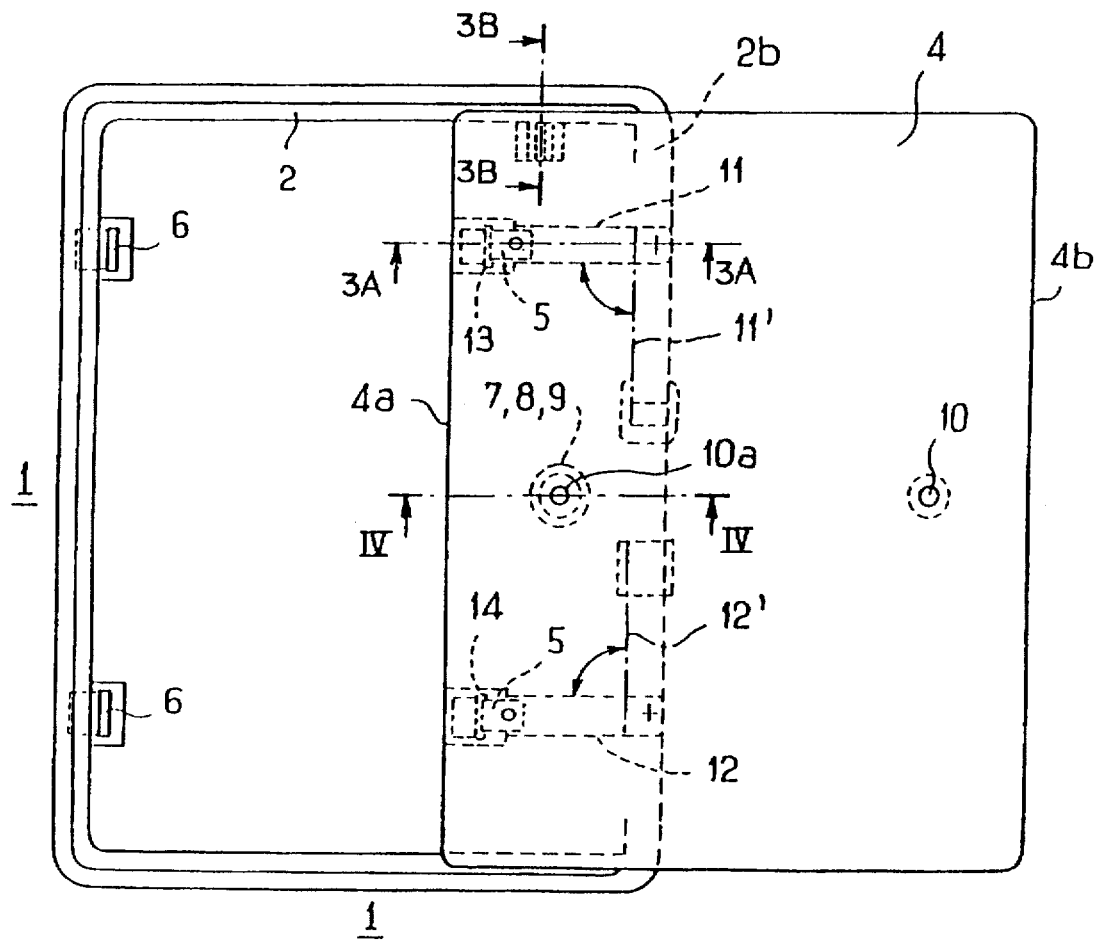
FIG_2

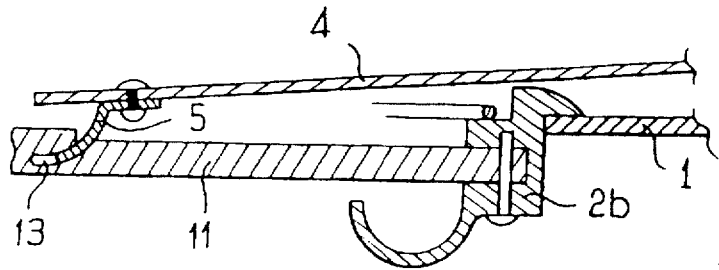
FIG_3A
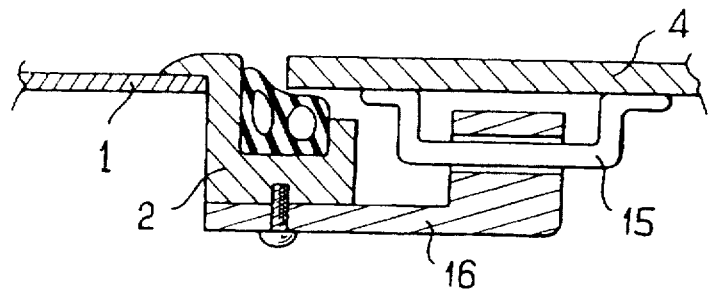
FIG_3B
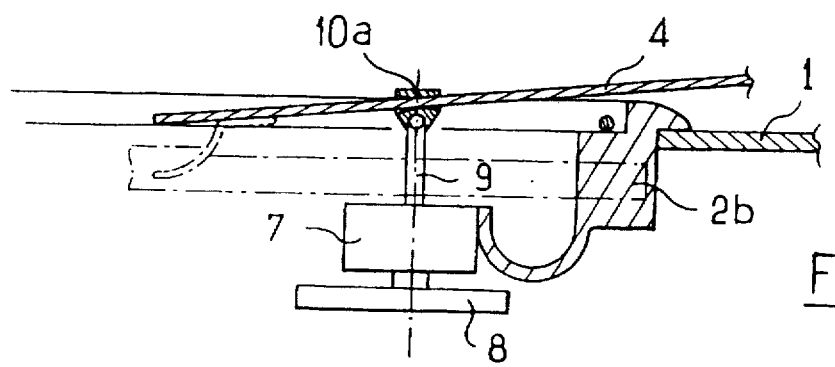
FIG_4
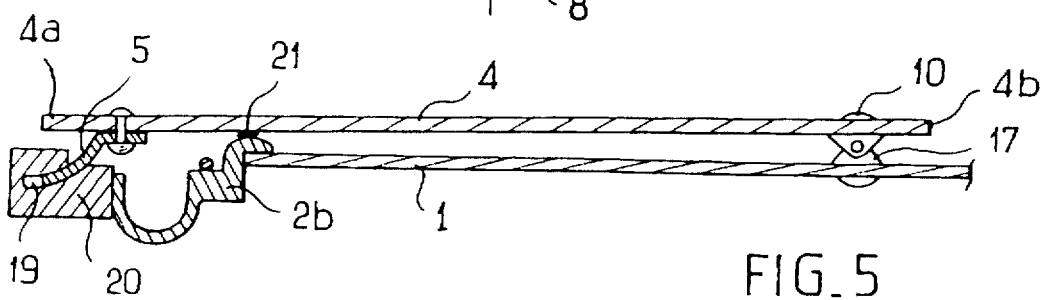
FIG_5
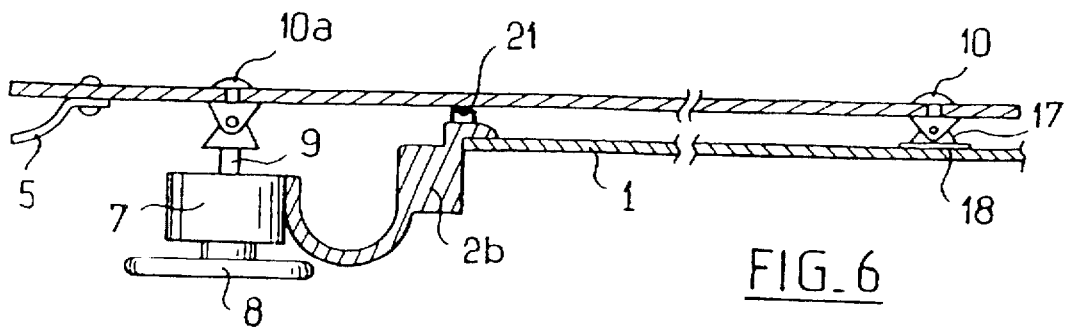
FIG_6

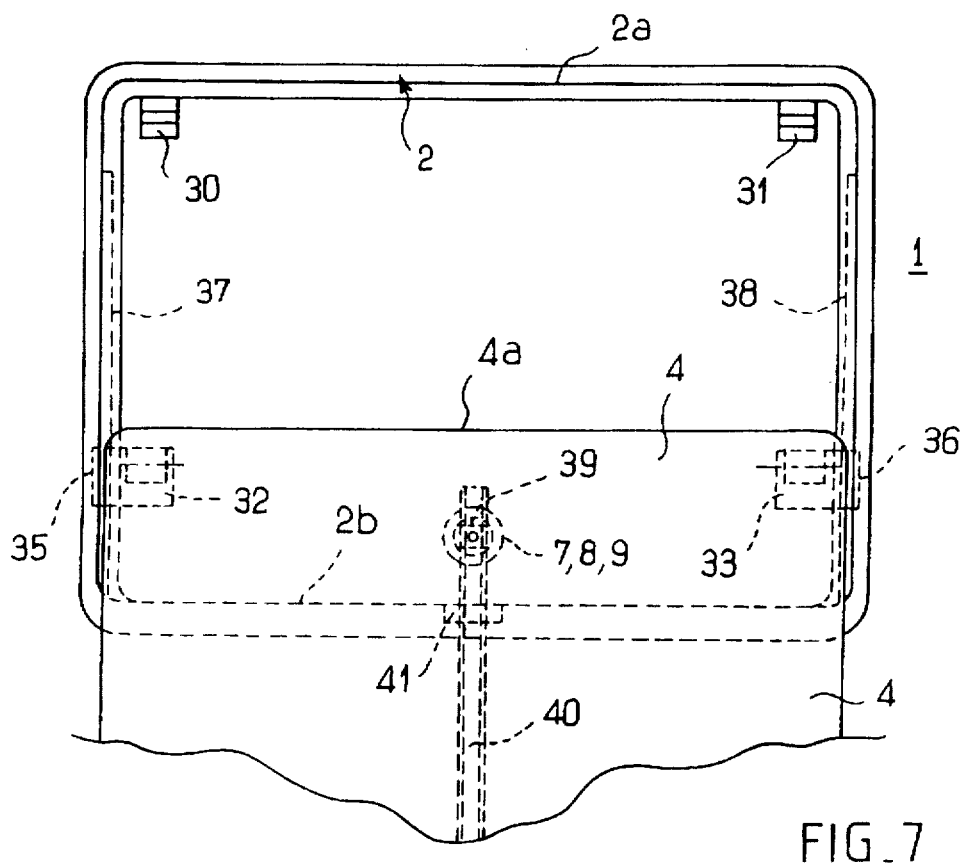
FIG_7
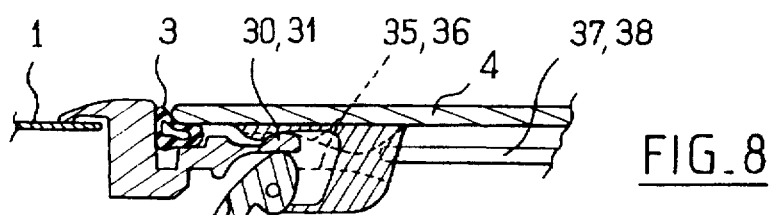
FIG_8
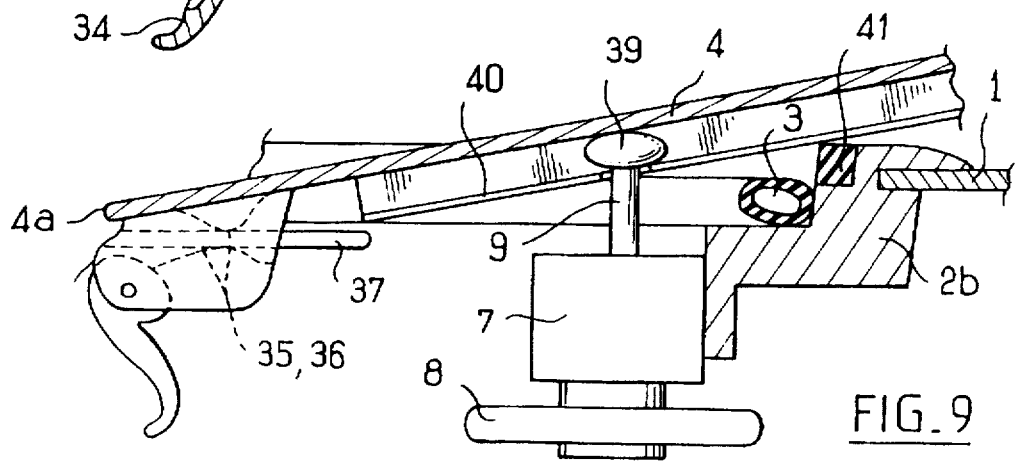
FIG_9

OPENING ROOF STRUCTURE FOR A MOTOR VEHICLE

This application is a Continuation of Ser. No. 08/397,048, filed as PCT/FR94/00922, Jul. 22, 1994, now abandoned.

The present invention relates to an opening roof structure for a motor vehicle, the structure comprising a closure member, usually a transparent window, which closes an opening formed in the roof of the vehicle and which is capable either of tilting to open ajar, or of disengaging the opening, at least in part.

There are several types of opening roof for motor vehicles. All of them comprise a frame around the edge of an opening formed in the roof of the vehicle and a panel which is movable relative to the frame, between a closed position in which it sealingly closes the opening in the roof and an open position in which it disengages at least a portion of the opening. In the simplest structure, the front edge of the panel is hinged to the frame and its rear edge is attached to an actuating device for tilting the panel about its front hinge. The actuating device is generally a toggle-type mechanism or a kind of screw jack which can be manually operated from within the passenger compartment of the vehicle. Such actuation therefore allows the panel to be opened ajar relative to the frame. In most cases, the panel is removably hinged to the frame and removably secured to the actuating device. The panel can therefore be removed completely to open the opening in the roof of the vehicle completely. This facility is used only rarely by vehicle users since the removed panel has to be stored in the vehicle. The panel is usually bulky and difficult to handle. Besides, since it is a glass window, there is a risk of it being broken while being handled.

Much more complicated structures also exist in which there is a secondary framework between the frame and the panel, this framework being formed by telescopic grooves which are hinged to the frame at the front to allow the window-and-framework assembly to open ajar, the window also being slidable relative to the frame either in the plane of the frame, or above it once it has been opened ajar. It is therefore possible to uncover the opening which is surrounded by the frame, at least to some extent. Those complex structures are generally expensive and are therefore not popular with customers.

The present invention seeks to offer a cost-effective solution which provides both functions of an opening roof, i.e. opening ajar to form a ventilation opening or virtually complete uncovering of the opening to give wide-open access to the sky.

To this end, the invention therefore provides an opening roof structure for a motor vehicle, the structure comprising a frame secured around the edge of an opening formed in the roof of the vehicle, a window which in a first position forms a panel for at least substantially closing the opening, hinge means for the window which are integral with the front edge of the frame to removably receive corresponding means secured to the window, and pivot control means for pivoting the window about its hinge to the frame, the control means extending between the rear edge of the frame and the window, from which they can be separated, at least in part. According to the invention, both the frame and the window have coupling means in waiting which are placed in mutual co-operation when, after the window has been uncoupled from the hinge means and at least partly separated from the pivot control means, the window is placed in a second position in which it overlies the rear edge of the frame.

The structure of the invention therefore has the simplicity of a simple opening roof capable only of pivoting to open ajar. Compared to that simple structure, it also has the significant advantage of offering a storage location for storing the panel when the roof opening is wide open, this storage location being situated for the most part over the roof, and being made available by the coupling means in waiting provided at least between the frame and the panel. The panel can thus be opened wide without taking up space in the boot or in the passenger compartment of the vehicle.

The coupling means in waiting for securing the panel to the vehicle in a wide-open position may take numerous different forms. However, that portion of the coupling means in waiting which is integral with the window should advantageously be disposed at the vertices of a triangle one of whose sides is parallel to the edge of the frame which is overlaid by the window, the coupling means carried by the frame being at least two in number so as to co-operate with said coupling means in waiting integral with the window and situated at the ends of that side of the triangle which is parallel to the overlaid edge of the frame. This constitutes a condition which it is important to satisfy since, when the window is extracted from the frame, it needs to be kept stable in the wide-open, second position.

The means for coupling the window to the roof in the wide-open second position may be entirely separate from the means which hold the frame in the first position where the window is closed or opened ajar, however it is advantageous for at least some of those means to be used in both positions.

Thus in a first embodiment, the coupling means carried by the window and situated at those ends of the side of the triangle that is parallel to the overlaid edge of the frame, are constituted by the hinge means whereby the window is hinged to the front edge of the frame, the frame including corresponding means in the vicinity of its rear edge for receiving the afore-mentioned hinge means.

In a second embodiment, the coupling means carried by the window and situated at the ends of the side of the triangle that is parallel to the overlaid edge of the frame, comprise lateral hooks which can be engaged in corresponding hooks which are integral with the edges of the frame adjacent the overlaid edge.

In a third embodiment, the coupling means carried by the window and situated at the ends of the side of the triangle that is parallel to the overlaid edge of the frame, are constituted by lateral runners for guiding the window in lateral rails carried by the frame, the greater length of these rails ensuring that the window is guided in its movement from the first position towards the second and vice versa, the rear portions of the rails constituting coupling means in waiting which co-operate with the runners to couple together the window and the frame when the window is in its second position.

In all three embodiments, the third means for coupling the window to the frame is constituted by that portion of the pivot control means of the window which is integral with the frame, and by a corresponding window-carrier means for coupling the frame to the window. In a variant, this means is a duplicate of the means included on the window in the vicinity of its edge for co-operating with the screw jack that allows the window to be opened ajar.

In a second variant, the means for coupling the window to the pivot control means is constituted by a central slide which is carried on the lower surface of the window and in which the free end of the pivot control means is slidably mounted on a permanent basis. It will be understood that the window may thus be partly uncoupled from the means which, in the first position of the window, co-operate with the rear end of the slide so as to press the window against the frame and its seal in order to close the opening, and which, in the second position of the window, co-operate with the front end of the slide so as to hold the window firmly against the frame by pulling it downwards while it is overlying the rear edge of the frame. In that state, the window is pressed firmly against the frame by the runners, hooks, or other devices provided laterally at the ends of the afore-mentioned side of the triangle and by the slide which bears on the rear edge of the frame which is provided with a flexible protector for this purpose. It should be noted that this central slide, which is in the middle of the window and parallel to its direction of displacement, also constitutes a guide for such displacement while changing the position of the window.

In a third variant, the third coupling means for the window is constituted by that portion of the pivot control means for the window which is carried by the window and also by a coupling member for said means which is carried by the roof of the vehicle beyond the overlaid edge of the frame. This means may be connected to the roof by riveting or by any permanent or temporary fastening method such as adhesive, for example, or may even be fastened by means of fabric tapes with a gripping effect such as those known under the trade name "Velcro".

In another embodiment of the invention, in the vicinity of its front edge, the window includes a duplicate of the coupling means for securing the pivot control means, the rear edge of the frame including window-supporting runners on its outside face, and the roof including a member for receiving the coupling means carried by the window for securing the pivot control means. In this case, two means exist for coupling to the window on either side of the overlaid edge, and the window rests firmly on that edge because of the supporting runners.

Other features and advantages of the invention appear from the following description of various embodiments, given by way of example.

Reference is made to the accompanying drawings in which:

FIG. 1 is a schematic view of a prior art tilting opening roof in which the panel is removable;

FIG. 2 is a schematic plan view of an opening roof of the invention;

FIG. 3A is a schematic section view on line 3A—3A of FIG. 2;

FIG. 3B is a schematic section view on line 3B—3B of FIG. 2;

FIG. 4 is a section view on line IV—IV of FIG. 2;

FIG. 5 is a section view of a second embodiment of the opening roof of the invention in its open position;

FIG. 6 is a section view of a third embodiment of the opening roof of the invention in its open position;

FIG. 7 is a schematic plan view of another embodiment of an opening roof of the invention;

FIG. 8 is a schematic section view of the uncouplable means for hinging the window to the frame; and FIG. 9 is a schematic section view showing how the window co-operates with the means for controlling its pivoting via a slide, the window being in its second position.

In the prior art shown in FIG. 1, the roof 1 of a motor vehicle is provided with an opening surrounded by a frame 2. A backing frame, not shown, enables the frame 2 to be clamped onto the edges of the opening in the roof 1 of the vehicle. The frame 2 includes a sealing element 3 intended to be laid between the frame 2 and a panel 4 for closing the opening surrounded by the frame 2. In the vicinity of its front edge 4a, the panel 4, generally a window, includes arcuate elements 5 slidable in the curved slides 6 which are integral with the frame 2 and which form a sliding-hinge between the panel and the frame. At its center, the rear edge 2b of the frame includes a device 7 of the screw-jack type which is movable by means of a knob 8 and is releasably attached by its end 9 to a coupling element 10 integral with the panel 4 in the vicinity of its rear edge 4b. This device constitutes the means for pivoting the panel relative to the frame 2 about its hinge 5, 6 on the front edge 2a of the frame so that, when the panel 4 is retracted, it presses against the seal 3 of the frame 2 (arrow D), and when it is extended, it is opened ajar relative to the plane of the frame so as to create an opening for ventilating the passenger compartment of the vehicle.

Using that prior art opening roof, when the opening in the roof is to be opened wide, the panel is uncoupled at the releasable coupling 9, 10 and the arcuate elements 5 are extracted from their slides 6, after which the panel 4 is stored inside the vehicle.

In accordance with the invention, the opening roof includes means for securing the panel 4 in a position in which the opening surrounded by the frame 2 is open wide, with the panel overlying the rear edge 2b of the frame, thereby avoiding any need to find room inside the vehicle for storing the panel.

To this end, in a first embodiment of the invention, the rear edge 2b of the frame includes two arms 11, 12 which pivot between a stowage first position 11', 12'in which they extend parallel to the edge 2b, and an operating second position 11, 12 in which they extend perpendicular to that edge 2b within the opening of the frame. Their free ends include slides 13, 14 similar to the slides 6 in which the arcuate elements 5 of the panel 4 can be engaged.

In the vicinity of its front edge 4a, the panel 4 has means 10a similar to the means 10, whereby it can be coupled to the raising screw jack 7 and which lie directly above that screw jack 7 when the arcuate elements 5 are engaged in the slides 13 and 14 (see FIG. 4). The arcuate elements 5 and the coupling element 10a which are integral with the panel 4 constitute the coupling means in waiting belonging to the panel. These means are intended to co-operate with the slides 13, 14 on the hinged arms 11, 12 and with the screw jack 7 which constitute other coupling means in waiting, but belonging to the frame 2. When the panel 4 is uncoupled from the slides 6 and from the screw jack 7, its coupling means in waiting enable it to be re-coupled in a wide-open fixed position in which it uncovers the opening of the frame 2 and overlies the rear edge 2b of the frame. As illustrated in FIG. 2, the arcuate elements 5 and the coupling element 10a are situated at the vertices of a triangle, one side of which, namely the side joining the two arcuate elements 5, is substantially parallel to the overlaid edge 2b. This three-point coupling ensures that the panel is perfectly stable on the frame when in its wide-open second position.

In a variant, instead of using the arcuate elements 5 as coupling means in waiting for securing the panel 4 to the frame 2 while in the wide-open second position, the panel 4 may, as illustrated in FIG. 3b, be provided with handles 15 projecting from its lower surface, in the vicinity of each of its front corners, each handle being receivable in a U-shaped opening carried by an arm 16 secured to the frame 2 at each of its two edges adjacent the rear edge 2b, these arms projecting inside the opening so as to intercept the handles 15 when the panel 4 is placed to so as overlie the edge 2b. The third coupling point may be constituted by the element 10a carried by the panel 4 co-operating with the screw-jack 7, the element 10a being a duplicate of the element 10.

The third coupling point for the panel in its wide-open second position may be constituted by a coupling means in waiting which is secured directly to the roof beyond the edge 2b of the frame 2 as illustrated in FIG. 5. By way of example, this coupling means may a kind of yoke 17 riveted to the roof and capable of co-operating by pin-engagement with the coupling means 10 provided in the vicinity of the edge 4b of the panel 4. The element 17 may be secured to the roof 1 by riveting or it may be connected to thereto by gluing or even by means of mutually hooking elements such as those known under the trade name "Velcro" and referenced 18 in FIG. 6. Such coupling enables the panel 4 to be drawn back to a maximum extent with respect to the edge 2b of the frame so as to make the largest possible opening available. In that case, locations 19 for receiving the arcuate elements 5 may be provided in parts 20 which are integral with the edge 2b of the frame. It should be observed in FIG. 5 that the edge 2b has runners 21 on its outside surface against which the panel 4 is forced, deflecting it slightly so that the coupling means 10 and 17 are mated.

Finally, FIG. 6 illustrates schematically another embodiment of the invention in which the screw jack 7 co-operates with the coupling means 10a provided on the panel 4 in the vicinity of its front edge 4a, whereas the means 17 provided on the roof co-operate with the previously-described coupling means 10. The panel 4 can therefore be forced by the screw jack 7 to bear firmly against the runners 21 carried on the rear edge 2b of the frame 2, ensuring good stability of the panel. In this embodiment, the runners 21 which lie over the edge 2b of the frame 2 co-operate with the coupling elements 17 and 7 to provide the triangulation necessary for holding the panel 4 to the roof of the vehicle. In this connection, it will be noted that even in the embodiments of FIGS. 3a, 3b and 4, the rear edge 2b of the frame may constitute a support for the panel by appropriately operating the screw jack 7, thereby taking up any play in the mounting and avoiding vibration which could generate noise.

Some of the elements described with reference to the preceding figures can be found in FIGS. 7 to 9. These illustrate an embodiment which includes means allowing the window to be guided while its position is being changed, in addition to providing means for securing the window 4 to the frame 2 in its wide-open position.

The means whereby the window is hinged to the frame at the front edge 4a of the window are different from the above-described slides and arcuate elements. These means comprise two tabs 30, 31 integral with the front edge 2a of the frame and projecting inside it, these tabs co-operating with yokes 32, 33 carried on the window. In its closed position, the tabs 31, 31 are covered by the yokes 32 and 33. Each yoke has a locking cam lever 34 which is hinged in the yoke and which, when pushed forwards (in the clockwise direction in FIG. 8), clamps the respective tab 30, 31 between two surfaces which allow the window to pivot a little about the captive portion of the tab. Rotation of the levers 34 in the opposite direction releases the tabs which can then be released from the corresponding yokes.

The sides of the window in the vicinity of its front edge 4a are equipped with sliding runners 35 and 36, either integrally with the yokes or as separate parts, which runners 35, 36 open laterally outwards and can overlie a fixed rail 37, 38 carried by the lateral members of the frame 2, this occurring when and only when the hinge action on the tabs 30, 31 is released and disengaged by rearward movement of the window. Moreover, the movement can only occur if the window is open ajar so that its rear edge can escape from the rear edge 2b of the frame. The levers 34, as illustrated in FIG. 9, therefore constitute handles for moving the window rearwards.

In order to allow this sliding, the end 9 of the screw jack 8 must be uncoupled from the window 4. This end then constitutes a support on which the window can slide. This may also be the case in the embodiments previously described. However, it is preferable, and mechanically more satisfactory, to provide the end 9 of the screw jack 8 with a slide runner 39 permanently located in a slide 40 carried on the lower surface of the window 4. The length of the slide 40 is such that, in order to secure the window in the position where it closes the opening, the runner 39 co-operates with the rear portion of the slide and draws the window downwards against the seal 3. In the position in which the window is clear of the opening (shown in FIG. 9) the runner 39 co-operates with the front portion of the slide 40. On retracting the screw jack 8, the window is forced by the runners 35, 36 to bear against the rails 37, 38 and by the slide 40 to bear against the rear side 2b of the frame 2 which is provided at that location with a flexible pad 41. In order to close the opening again, it is sufficient to "unscrew" the screw jack 8, to raise the window so there are no longer any forces pressing downwards, and to push on the levers 34 to draw the window forwards. The clamping of the front hinges makes the front portion of the window secure in the frame, and simultaneously tightening the screw jack 8 causes the rear portion of the window to press against the seal.

It may be advantageous to provide the screw jack 8 with devices to inhibit rearward sliding of the window if it is open ajar, but at too great an angle. For example, the shape or the material of the runner 39 may be such that beyond a certain stroke of the screw jack 8 it constitutes a stop in the slide that prevents any sliding. Systems may also be provided for locking the screw jack in the state corresponding to immobilization of the window overlying the rear edge 2b of the frame, so as to avoid unlocking under the effect of vibration.

We claim:

1. An opening body structure for a motor vehicle, the structure comprising a frame secured around an edge of an opening formed in the body of the vehicle, said frame having at least a first and a second portions substantially parallel to each other, a window which in a first position forms a panel for at least substantially closing the opening, hinge means for the window which are integral with said first portion of the frame to removably receive corresponding means secured to the window, and pivot control means for pivoting the window about said hinge means to the frame, said control means extending between said second portion of the frame and the window and being connectable to the window in more than one location of the window at control coupling means, wherein both said frame and said window carry coupling means in waiting which are placed in mutual co-operation when, after the window has been uncoupled from the hinge means and disconnected from the pivot control means, the window is placed in a second position in which the window overlies said second portion of the frame so that the window is pressed against said second portion when said coupling means in waiting are in mutual cooperation.

2. A structure according to claim 1, wherein the coupling means in waiting carried by the window include three coupling elements arranged at the vertices of a triangular array one of whose sides is parallel to said second portion of the frame which is overlaid by the window, and wherein the frame includes at least two coupling means to co-operate with said coupling elements in waiting carried by the window and situated at the ends of the side of the triangular array which is parallel to the overlaid second portion of the frame.

3. A structure according to claim 2, wherein the coupling elements carried by the window and situated at said ends of the side of the triangular array that is parallel to the second portion of the frame, are constituted by the hinge means whereby the window is hinged to said first portion of the frame, the frame including corresponding means in the vicinity of said second portion for receiving the aforementioned hinge means.

4. A structure according to claim 2, wherein the coupling elements carried by the window and situated at the ends of the side of the triangular array that is parallel to the overlaid second portion of the frame, comprise handles which can be engaged in corresponding members carried by the frame adjacent the overlaid edge.

5. A structure according to claim 2, wherein the coupling elements carried by the window and situated at the ends of the side of the triangular array that is parallel to the second portion of the frame, are constituted by runners for guiding the window between said first and second portions in rails carried by the frame, the part of the rails adjacent said second portion constituting said coupling means carried by the frame which co-operate with the runners to couple together the window and the frame in the second position of the window.

6. A structure according to claim 2, wherein the frame includes a further coupling means constituted by a part of said disconnectable pivot control means of the window which is carried by the frame for cooperating with said third coupling element carried by the window when overlaying said second portion of the frame.

7. A structure according to claim 2, wherein one of said three coupling elements carried by the window is constituted by a part of said disconnectable pivot control means carried by the window, the body of the vehicle including a corresponding coupling member beyond said second portion of the frame.

8. A structure according to claim 1, wherein said second portion of the frame includes support runners for the window.

9. A structure according to claim 1, wherein the window includes a duplicate of the control coupling means for securing the disconnectable pivot control means, and wherein said second portion of the frame includes window-supporting runners on its outside face and wherein the vehicle body includes a member for receiving the control coupling means of the pivot control means carried by the window when overlying said second portion of the frame.

10. A structure according to claim 1, wherein said pivot control means extends between said second portion of the frame and the control consisting means coupling a slide which is carried on the window and facing said opening and in which said pivot control means is slidably mounted, wherein the coupling means in waiting carried by the window include three coupling elements engaged at the vertices of a triangular array one of whose sides is parallel to said second portion of the frame, wherein the frame includes two, said coupling means in waiting to cooperate with said coupling elements carried by the window and situated at the ends of the side of the triangular array which is parallel to the second portion of the frame and wherein the third coupling element carried by the window is constituted by an end portion of said slide, a third coupling means in waiting carried by the frame being constituted by said pivot control means cooperating with said end of the slide.

* * * * *